United States Patent

Bender et al.

[11] Patent Number: 5,465,589
[45] Date of Patent: Nov. 14, 1995

[54] IDLE AUTOMATED A/C SYSTEM

[75] Inventors: Burnell L. Bender, Woodburn; Brian P. Marshall, Fort Wayne, both of Ind.

[73] Assignee: Navistar International Transportation Corp., Chicago, Ill.

[21] Appl. No.: 278,370

[22] Filed: Jul. 21, 1994

Related U.S. Application Data

[63] Continuation-in-part of Ser. No. 117,476, Sep. 7, 1993, abandoned.

[51] Int. Cl.⁶ ............................. F01P 5/00; F25B 39/04
[52] U.S. Cl. ........................ 62/133; 62/184; 62/243; 236/35; 123/41.12
[58] Field of Search ........................... 62/133, 148, 181, 62/183, 184, 239, 243, 244, DIG. 17; 236/35; 123/41.12, 41.46, 41.49

[56] References Cited

U.S. PATENT DOCUMENTS

| | | | |
|---|---|---|---|
| 4,222,353 | 9/1980 | Abe et al. | 62/243 X |
| 4,425,766 | 1/1984 | Claypole | 62/133 |
| 4,488,410 | 12/1984 | Seiderman | 62/133 |
| 4,546,742 | 10/1985 | Sturges | 123/41.12 X |
| 4,590,772 | 5/1986 | Nose et al. | 62/184 |
| 4,651,922 | 3/1987 | Noba | 123/41.49 X |
| 5,018,484 | 5/1991 | Naitoh | 123/41.12 |
| 5,186,015 | 2/1993 | Roehrich et al. | 62/123 |

OTHER PUBLICATIONS

"International Electrical Circuit Diagrams—9300,9400" Navistar International Transportation Corp. No. 108757–Ri, Jan. 1992, p. 87.
"Electrical Circuit Diagrams—2000, 4000, 7000, 8000" Navistar International Transportation Corp. No. 1087515–R1, Jan. 1991, p. 124.

*Primary Examiner*—Harry B. Tanner
*Attorney, Agent, or Firm*—Dennis K. Sullivan

[57] ABSTRACT

When the driver parks a truck for the purpose of sleeping in the cab's bunk space and desires to have the air conditioner operate, fan clutch cycling, which may create objectionable noise that disturbs sleep, is avoided by the inclusion of a branch circuit off of the air conditioner switch that comprises a parking brake switch in series with a relay coil. When the air conditioner is on and the parking brakes are set, this relay coil is energized to open a circuit to the engine fan clutch solenoid, preventing the fan clutch from being disengaged, and thereby keeping the fan in driven relation to the engine crankshaft so that fan clutch cycling does not occur.

18 Claims, 4 Drawing Sheets

IDLE AUTOMATED A/C SYSTEM

CROSS-REFERENCED TO RELATED APPLICATION

This application is a continuation-in-part of application Ser. No. 08/117,476, filed Sep. 7, 1993, abandoned, and assigned to the assignee hereof.

FIELD OF THE INVENTION

This invention relates generally to automotive vehicles that have air conditioning (A/C) for cooling their passenger compartments. In particular, the invention relates to a new and unique means to avoid extra engine cooling fan clutch cycling when a vehicle is parked with its engine idling so that noise and fan clutch wear that result from such extra cycling are avoided.

BACKGROUND AND SUMMARY OF THE INVENTION

Certain heavy truck models have a passenger compartment that includes sleeping accommodation. When a driver parks his or her truck for the purpose of sleeping, and weather conditions are conducive to the use of air conditioning for cooling the passenger compartment, the engine of the truck is allowed to idle for the purpose of driving the A/C compressor. If the engine cooling fan is driven directly from the engine, rather than through an intervening fan clutch, operation of the engine will also operate the engine fan, causing cooling air to be drawn through the radiator and the A/C condenser. When the engine cooling fan is coupled with the engine through a fan clutch, operation of the fan will depend on whether the clutch is engaged or disengaged.

The fan clutch is electromagnetically operated and is selectively engaged and disengaged by a fan clutch control circuit which may comprise an A/C refrigerant pressure switch and an engine coolant temperature switch in series with the fan clutch solenoid. The circuit is typically fed from the ignition terminal of the ignition switch. The fan clutch is typically engaged when its solenoid is not being energized. In other words, the solenoid must be energized to disengage the clutch. Both the A/C refrigerant pressure switch and the engine coolant temperature switch are normally closed, meaning that when the refrigerant pressure in the A/C system is below a certain predetermined pressure above which the engine fan clutch should be engaged, the refrigerant switch is closed, and when the engine coolant temperature is below a certain predetermined temperature above which the engine fan clutch should be engaged, the engine coolant temperature switch is closed. If either the refrigerant pressure rises above this predetermined pressure or the engine coolant temperature rises above this predetermined temperature, the fan clutch solenoid will drop out, causing the fan clutch to engage and couple the fan to the engine so that the fan will operate to draw cooling air through the radiator and condenser. Stated another way, the fan clutch solenoid will be energized only when the ignition is on, and both the refrigerant pressure in the A/C system is below the predetermined pressure and the engine coolant temperature is below the predetermined temperature, whereby when the ignition is on, the fan will not be operated so long as both the refrigerant pressure is below the predetermined pressure and the engine coolant temperature is below the predetermined temperature.

Actual experience has shown that the fan clutch cycles frequently when the truck is parked with the engine idling and the A/C turned on. Such cycling tends to accelerate clutch wear and to generate extra audible noise. Accelerated clutch wear increases the operating cost of the vehicle, and the extra noise may disturb the sleep of the driver. Certain governmental regulations may also apply to the noise level, and the vehicle manufacturer must comply with any applicable regulations at the time of vehicle manufacture.

The present invention relates to an improvement for eliminating fan clutch cycling when a vehicle is parked, its engine is idling, and the air conditioning is on. The invention can be implemented in existing systems with a relatively small number of conventional electrical components. In the disclosed embodiments of the invention, these components are electromechanical switches and relays. The present invention is believed to be superior to the already known, but possibly non-compliant, expedient of simply using a bypass switch to bypass the automatic function of the existing controls for the purpose of preventing clutch cycling at idle when the air conditioning is on.

Briefly, the present invention contemplates the inclusion of a relay in the existing fan clutch control circuit. The relay may be under the control of an idle sensing switch and a parking brake switch so that when the accelerator pedal is in idle and the parking brake is set, the relay opens the feed to the fan clutch solenoid, preventing the clutch from being disengaged; however, in a presently preferred embodiment, the relay may be solely under the control of the parking brake switch relying on the engine to be in idle when the parking brake is set for any extended period with the engine running. In this way, clutch cycling is prevented when the vehicle is parked and the engine is idling. Further details of the implementation may depend on the specific vehicle involved, and so two specific implementations will be disclosed in this patent application for two different vehicles. These implementations are cost-effective ways for obtaining desired performance involving the addition of only a few conventional circuit components.

The foregoing, along with further features, advantages, and benefits of the invention will be seen in the ensuing description and claims which are accompanied by drawings. They disclose a presently preferred embodiment according to the best mode contemplated at this time for carrying out the invention.

DESCRIPTION OF THE INVENTION

Figure 1:
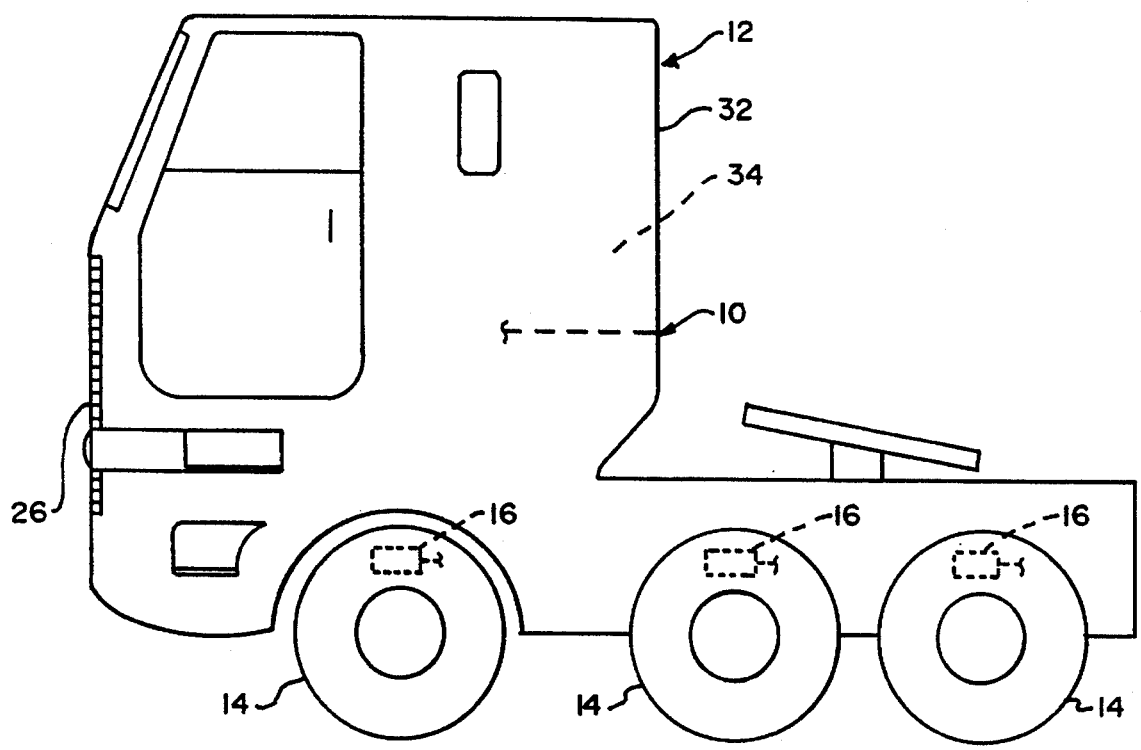
FIG. 1 is a left side view of a truck embodying the invention.
Figure 2:
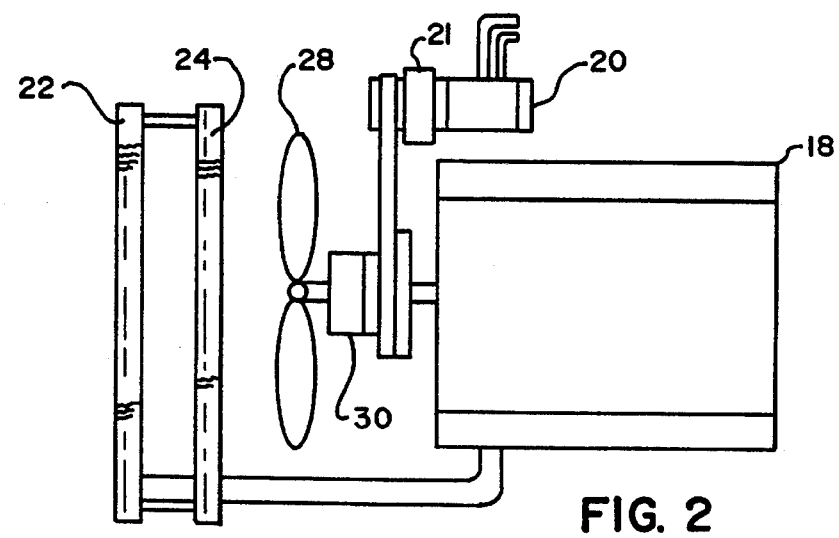
FIG. 2 is a top view, somewhat schematic in nature, of certain portions of the truck that relate to the invention.

FIGS. 1 and 2 depict those portions of a representative heavy truck 10 that pertain to the present invention. A chassis 12 comprises wheels 14 with which a parking brake system 16 is associated. Certain wheels 14 are driven by a powertrain which comprises a heat engine 18, typically Diesel, acting through a clutch, transmission, driveshaft, and axle (not shown) to deliver power to these driven wheels.

Certain accessory devices are also driven by engine 18. One of these devices is an air conditioning (A/C) compressor 20 that is part of an A/C system of truck 10. Typically, the system includes a mechanism associated with the compressor for matching the compressor output to the cooling load, for example an A/C compressor clutch 21 or other compressor adjustment mechanism.

A cooling system is associated with engine 18 and comprises a radiator 22 through which engine coolant is circulated by an engine-driven pump (not shown). Heat carried by the circulating coolant to radiator 22 is rejected by transfer to air passing through the radiator. Heat carried by refrigerant that is circulated through the A/C system by compressor 20 is transferred to air passing through a condenser 24 of the A/C system. A common configuration for a vehicle like truck 10 comprises stacking the radiator and condenser uprightly, one in front of the other, at the front of the vehicle, just behind the vehicle's grille 26.

When the vehicle is moving forward, ram air passes through the grille, radiator and condenser. Under certain operating conditions, ram air may be non-existent or insufficient to provide adequate heat transfer from the radiator and condenser, and therefore the usual practice is to place directly behind the two, an engine cooling fan 28 that operates to draw air through them. In a heavy truck, a common practice is to couple the engine cooling fan to the engine crankshaft through a fan drive which includes an electromagnetic clutch 30 having a solenoid 36. When clutch 30 is energized by electric current, it is disengaged, thereby de-coupling fan 28 from the engine crankshaft. When clutch 30 is not energized by electric current, it is engaged, thereby coupling fan 28 in driven relation to the engine crankshaft. Selective operation of fan 28 by clutch 30 provides improved operating efficiency for the vehicle because the fan will not be wastefully operated when conditions do not require the added air flow through the two heat exchangers 22, 24 that the drive fan 28 would provide.

Truck 10 further comprises a cab 32 having a passenger compartment including a sleeping accommodation 34, typically a bunk space at the rear of a cab. When a driver parks a truck for the purpose of sleeping and also desires to have the passenger compartment and bunk space air conditioned, the engine is kept idling to provide power for operating the A/C compressor. The parking brakes are also set to prevent wheels 14 from rolling.

Absent the improvement that is provided by the present invention, fan clutch 30 is frequently cycled when engine 18 is only idling, sometimes cycling every fifteen to thirty seconds. Such repeated cycling may impose extra wear on the fan clutch and also generate noise that is disturbing to the sleep of the driver. The present invention relates to a means for avoiding these occurrences. Please therefore now refer to FIG. 3.

In addition to A/C compressor 20 and clutch 21, a representative A/C system comprises a blower motor control switch 38, a resistor assembly 40 (typically also containing a thermo fuse), a blower motor relay 42, a blower motor 44, an air conditioner switch 46, a temperature control switch 48, a low refrigerant relay 50, a low refrigerant pressure switch 52, a high refrigerant pressure switch 54, and an engine coolant temperature switch 56. In accordance with this embodiment of the invention, an engine idle switch 58, a parking brake switch 60, and a relay 62 are integrated into the circuit.

The circuit is configured for a negative ground so that positive D.C. voltage is applied at three points: battery 64, accessory 66, and ignition 68. The battery point 64 is directly connected to the positive battery terminal. The accessory point 66 is connected to the positive battery terminal via the accessory terminal of the vehicle's ignition switch (not specifically shown as such in the FIG.). The ignition point 68 is connected to the positive battery terminal via the ignition terminal of the ignition switch. Thus, only when the engine is running, are all three points 64, 66, 68 connected to the positive battery terminal.

Blower motor relay 42 comprises a coil 70 that controls a movable contact 72 that is connected to a terminal 73 of the relay. Coil 70 is connected between a high speed terminal 74 of blower control switch 38 and ground. When coil 70 is not energized, contact 72 engages a terminal 75 of relay 42 that is connected with a terminal 76 of resistor assembly 40. Terminal 73 is connected to one terminal 78 of blower motor 44. The other terminal 80 of motor 44 is grounded. Resistor assembly 40 has another terminal 82 that is connected to a medium speed terminal 84 of switch 38, and yet another terminal 86 that is connected to a low speed terminal 88 of switch 38. Switch 38 comprises an input terminal 90 that is connected through a fuse 92 to accessory point 66.

Blower motor 44 is part of a combination heater-A/C system of a truck, serving to move air in the passenger compartment of cab 32 in both heating and cooling modes. Switch 38 further comprises a movable contact 94 that is operated by a selector to any one of the following positions: off, low, medium, and high. The drawing shows the off position being selected. In this switch position, none of terminals 88, 84, 74 is connected to the positive battery terminal, and so motor 44 does not rotate the blower. When low speed is selected, movable contact 94 connects terminals 90 and 88 together so that the positive battery terminal is connected to terminal 86 of resistor assembly 40. Terminals 86 and 76 are at opposite ends of a resistance 96, including a thermo fuse 97, of assembly 40, while terminal 82 is connected to an intermediate tap between the ends of resistance 96. Thus, when low speed is selected, by movable contact 94 engaging terminal 88, the full resistance of resistor 96 is in series with motor 44 across the battery, and consequently, motor 44 operates at low speed. When medium speed is selected, movable contact 94 contacts terminal 84 to apply positive battery voltage to terminal 82. Now, less than the full resistance of resistor 96 is in series with motor 44, and so the motor operates at medium speed. When high blower speed is selected by contact 94 contacting terminal 74, coil 70, which had not been energized at low and medium speeds, now becomes energized and, as a result, the normally closed circuit between terminals 73 and 75 opens. Movable contact 72 now makes connection with another terminal 98 of relay 42 that is connected through a fuse 100 to battery point 64. Thus, the energization of coil 70 causes full battery voltage to now be applied across motor 44, thereby operating the motor at high speed.

Switch 38 has a further terminal 102 that is independent of the three terminals 74, 84, and 88, but that is connected to terminal 90, and hence accessory point 66, whenever control switch 38 is not off. The purpose of this is to prevent the A/C system from operating unless blower motor 44 is operating at at least low speed. Terminal 102 is connected to a terminal 104 of A/C switch 46. Switch 46 is open when A/C is not selected for operation and is closed when A/C is selected for operation. Switch 46 further comprises a load terminal 106 that connects to three branch circuits.

A first branch circuit comprises temperature control switch 48, a normally closed circuit between terminals 108 and 110 of low refrigerant relay 50, and a solenoid 112 of clutch 21. A second branch circuit comprises low refrigerant pressure switch 52 and a coil 114 of relay 50. A third branch circuit comprises engine idle switch 58, parking brake switch 60, and a coil 116 of relay 62.

When the A/C system is selected for operation by switch 46 being in the on position and switch 38 being in other than the off position, solenoid 112 can be energized to cause clutch 21 to be engaged, enabling compressor 20 to be driven by engine 18. Switch 48 comprises a thermostatic element that is disposed to sense temperature representative of conditioned air being delivered by the A/C system. When the thermostatic element is satisfied, switch 48 is open, causing solenoid 112 to be de-energized and clutch 21 disengaged. So long as the thermostatic element is not satisfied, switch 48 is closed, causing solenoid 112 to be energized and clutch 21 engaged. It is in this way that clutch 21 is duty cycle operated so that the conditioned air is modulated about an average desired temperature. Typically, switch 48 provides for the temperature at which the thermostatic element switches to be set to a desired setting over a range of possible settings. The operation just described presumes that there is sufficient refrigerant pressure in the system, causing the circuit between terminals 108 and 110 of relay 50 to remain closed.

Should there be insufficient refrigerant pressure, then switch 52 would close, causing coil 114 of relay 50 to be energized. The energization of coil 114 opens the normally closed circuit between terminals 108 and 110, prohibiting further energization of solenoid 112 in the process, so that compressor 21 would cease to operate. Relay 50 also includes a sealing circuit 117 for keeping the circuit between terminals 108 and 110 open once coil 114 has been energized. Once the coil 114 has been sealed, it can be unsealed only by removing power from terminal 108.

Prior to the incorporation of the present invention into the system, solenoid 36 of fan clutch 30 was under the sole control of switches 54 and 56 whereby fan 28 would operate when either the engine coolant temperature rose above a predetermined temperature or the refrigerant pressure rose above a predetermined pressure. With the incorporation of the present invention, a third condition will cause fan 28 to operate. That third condition is one in which both engine 18 is idling and the parking brakes of parking brake system 16 are set to prevent wheels 14 from rolling while the truck is parked.

Engine idle switch 58 and parking brake switch 60 are connected in series between load terminal 106 of A/C switch 46 and a terminal 118 of relay 62. Coil 116 is connected between terminal 118 and a second terminal 120. Terminal 120 is grounded. Relay 62 further comprises a movable contact 122 that is under the control of coil 116. When coil 116 is not energized, contact 122 completes a circuit between terminals 124 and 126 of relay 62; when coil 116 is energized, contact 122 opens that circuit. Switch 54 and switch 56 are connected in series between ignition point 68 and terminal 124. One terminal of solenoid 36 is connected to terminal 126, and its other terminal is grounded.

Engine idle switch 58 is disposed to sense engine idle. One way of doing this is by mounting the switch to sense when an associated accelerator mechanism 128 that is operated by the driver of the vehicle to accelerate the engine from idle is in fact in idle position. For example, switch 58 may be mounted in association with the usual accelerator pedal of the accelerator mechanism. Switch 58 is closed when the accelerator is in idle position, and when the accelerator is in a non-idle position, it is open.

Parking brake switch 60 is disposed to sense when the parking brakes are set (i.e. applied). It is open when the parking brakes are not set, and closed when they are set.

By connecting switches 58 and 60 in series with coil 116, coil 116 will not be energized either when the engine is not idling or when the parking brakes are not set. In other words, with the A/C on, this third branch circuit off of switch 46 requires that both the engine be idling and the parking brakes be set for coil 116 to be energized. Since the circuit between terminals 124 and 126 will remain closed unless coil 116 is energized, this means that concurrence of the engine idling and of the parking brakes being applied is required in order for this third branch circuit to drop out solenoid 36 and force fan 28 to operate. Since the parking brakes will typically be applied and the engine will typically be idling when the driver parks the vehicle in order to sleep, the use of the air conditioner under such conditions will be accompanied by assurance that fan clutch 30 will not cycle and that fan 28 will be operated continuously by engine 18.

Figure 3:
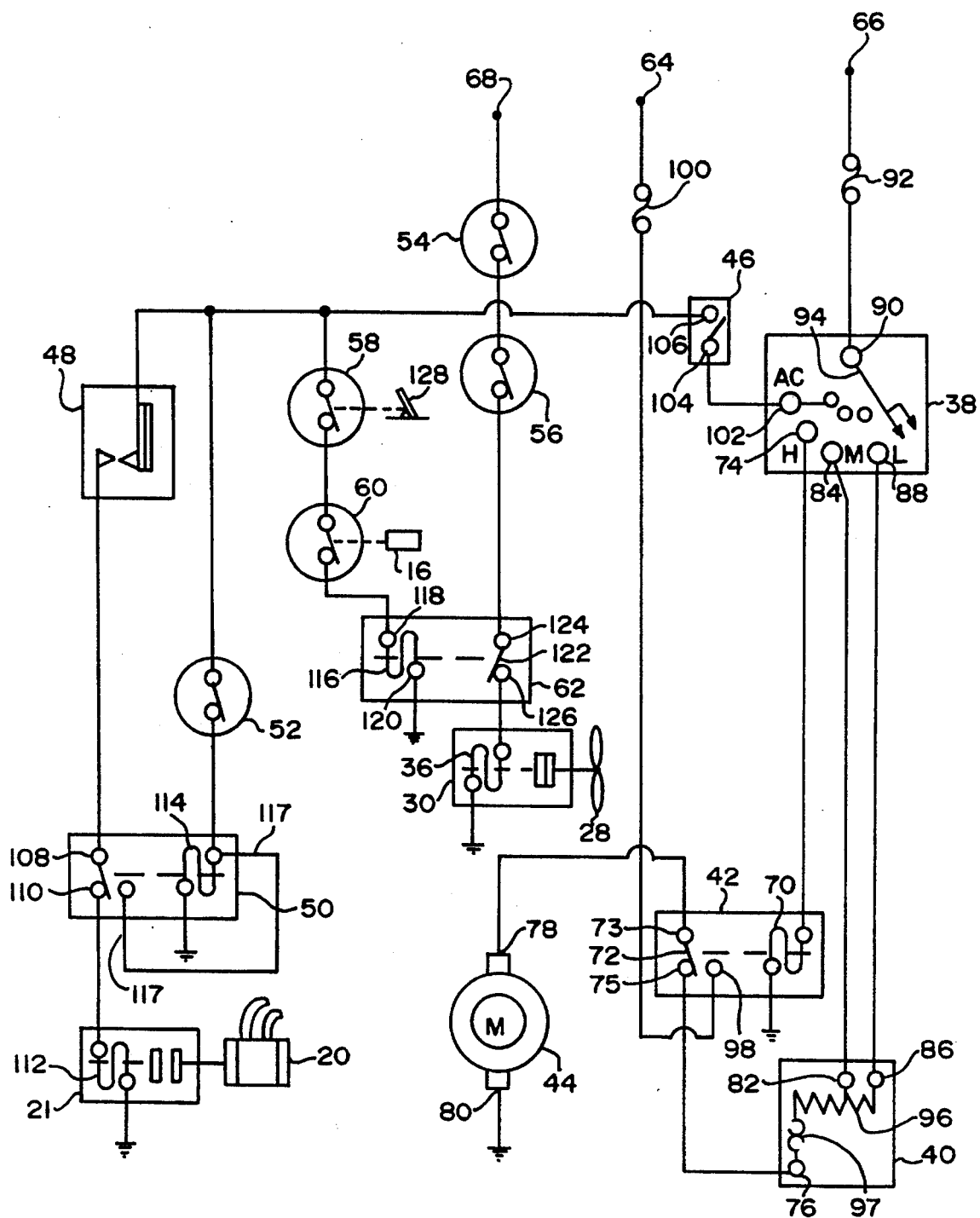
FIG. 3 is an electrical schematic diagram of a first implementation of the invention in a first truck model.
Figure 4:
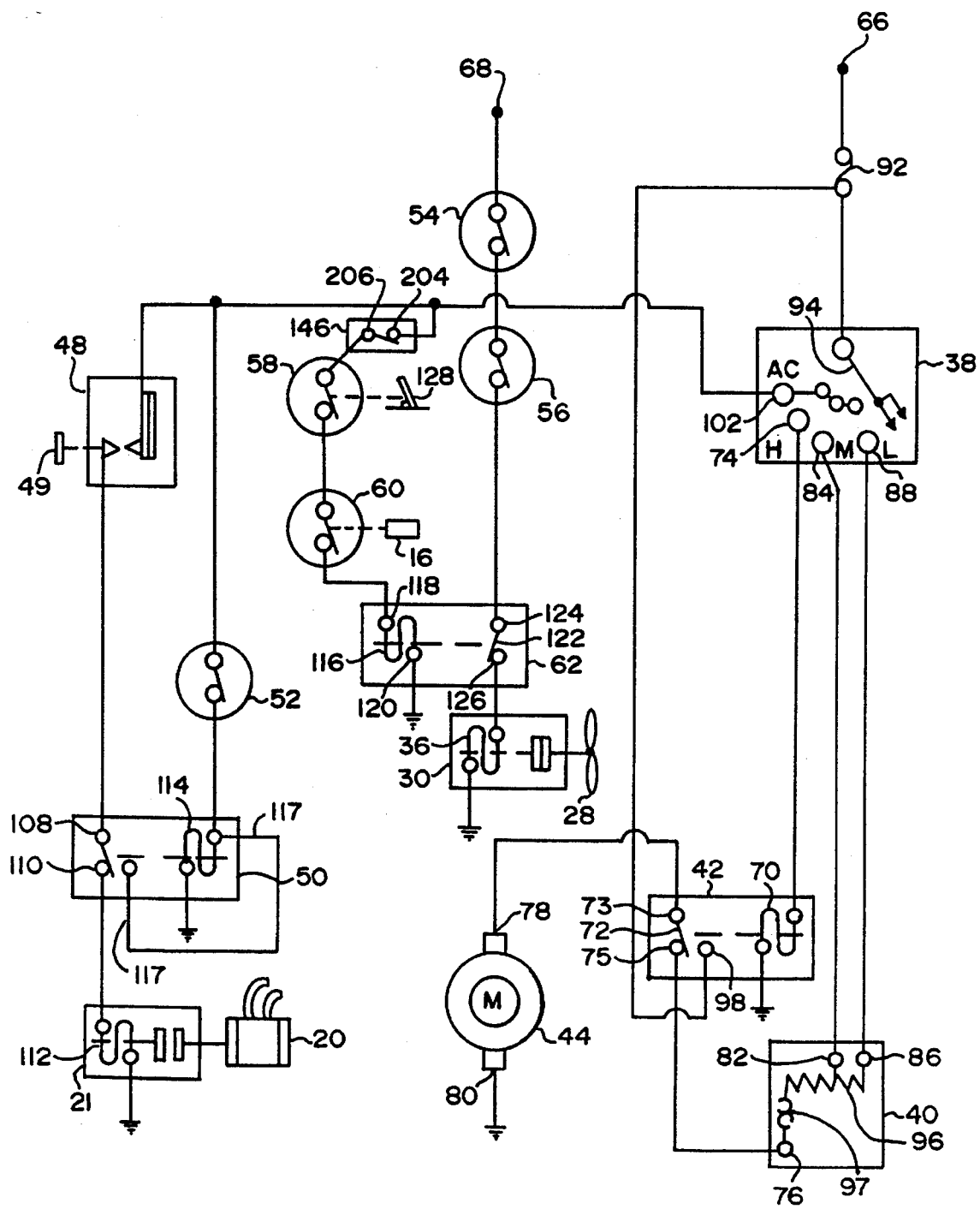
FIG. 4 is an electrical schematic diagram of a second implementation of the invention in a second truck model.

FIG. 4 shows an implementation in another truck model wherein like components from FIG. 3 are identified by like reference numerals. This implementation is similar to that of FIG. 3 except that the temperature control switch 48', in addition to having a thermostatic control, also has a manually controlled slider 49 which renders a separate on/off switch, such as switch 46 of FIG. 3, unnecessary. However, to avoid fan clutch cycling when the vehicle is parked with the engine idling, a manually operated switch 146 is provided in series with the engine idle switch 58 and the parking brake switch 60 in the branch line controlling the coil 166 of the relay 62. The switch 146 has terminals 204 and 206 which are connected in the "park" position of the switch and are open in the "drive" position. When the switch 146 is in the "park" or cooling position, this embodiment will function like that of FIG. 3. When the switch 146 is in the open "drive" or heating position, the coil 116 of the relay 62 cannot be energized and thus cycling of the fan clutch based on the engine coolant temperature will continue even when parked and the engine is at low idle. The "drive" or heating position is provided for winter operation when the vehicle is being heated in order to maintain higher coolant temperature by shutting off the fan as much as possible.

Figure 5:
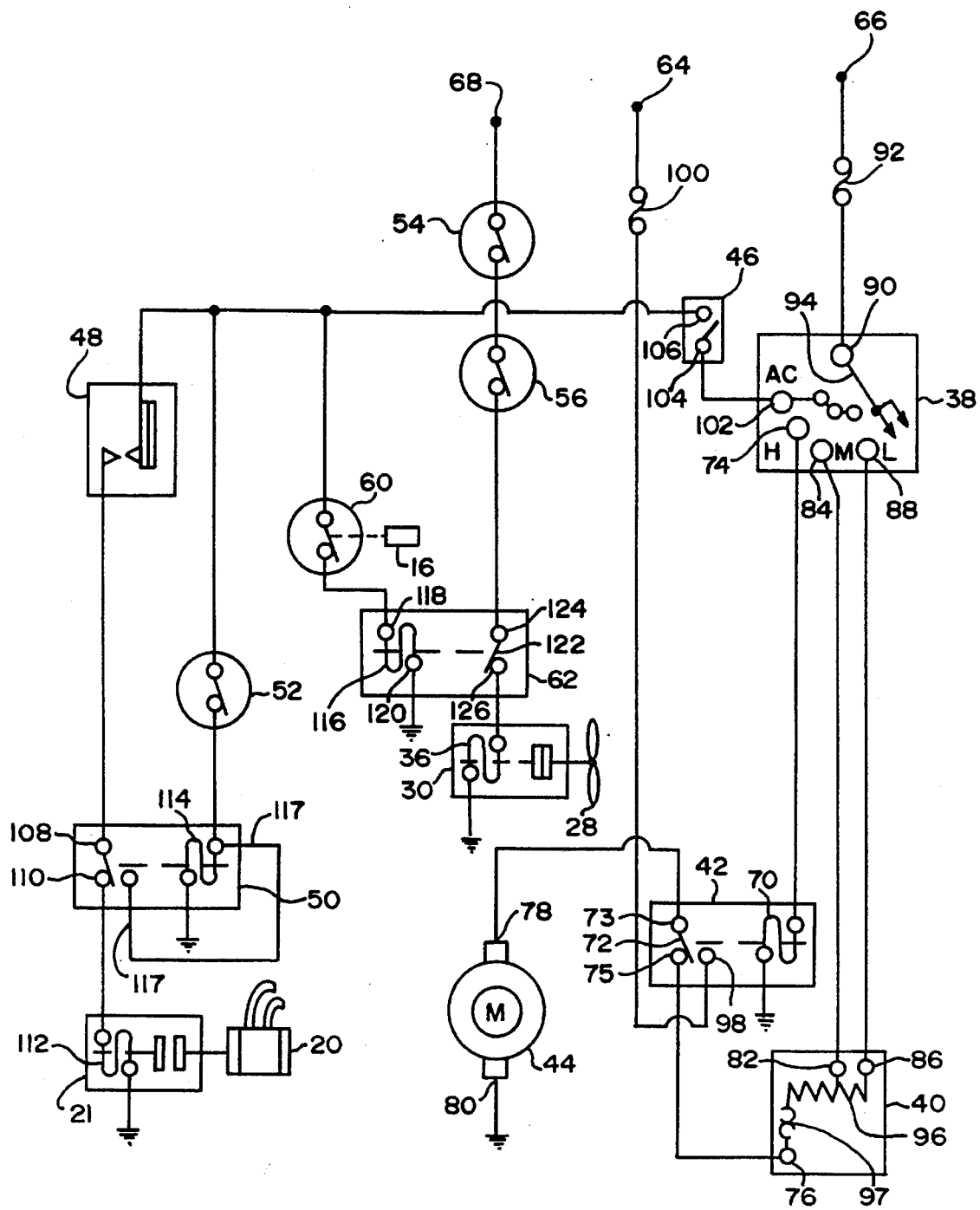
FIG. 5 is an electrical schematic diagram of a third implementation of the invention in a truck model similar to that shown in FIG. 3.

FIG. 5 shows a currently preferred implementation in a truck model similar to FIG. 3 wherein like components from FIG. 3 are identified by like reference numerals. This implementation is similar to that of FIG. 3 except that the engine idle switch 58 and associated accelerator pedal 128 have been removed from the coil circuit of relay 62 leaving the parking brake switch 60 to control the energization of the coil 166 of the relay 62. As a practical matter, if the driver has parked his truck with the engine running for an extended period for the purpose of sleeping, the engine will be idling in any event. Thus, the parking brake switch 60 itself indirectly senses that the engine is at idle and the engine idle switch 58 is redundant other than to prevent the engine from being idled at a higher speed than low idle which is unlikely and not necessarily objectionable. Accordingly, when the parking brakes 16 of the truck are set, the parking braking switch 60 is closed, thereby opening relay switch 122. The open switch 122 prevents disengagement of the fan clutch 30 and thus provides continuous operation of the fan 28. Otherwise, the embodiment of FIG. 5 is identical to that of FIG. 3 and operates identically.

From the foregoing, the reader can appreciate that an improved arrangement for avoiding fan clutch cycling when the vehicle is parked with the engine idling has been provided. It is believed that this arrangement offers important advantages over systems that either lack this feature entirely, or that strive to obtain the same result by means of a by-pass switch that simply forces the fan clutch to be engaged by a circuit from fan solenoid 36 through a by-pass switch back to the positive battery terminal. The invention can be implemented with a few conventional circuit components.

What is claimed is:

1. In a vehicle having a heat engine for powering the vehicle, a passenger compartment, an air conditioning (A/C) system that, when selected for operation, is powered by said engine to cool said passenger compartment, heat exchange means at which heat from said engine and said A/C system is rejected to a cooling medium, fan means for moving cooling medium past said heat exchange means, and fan control means for controlling said fan means, the improvement in said fan control means which comprises:

sensing means for sensing that the vehicle is parked; and means operatively coupled with said sensing means for causing, when said A/C system is selected for operation, said fan means to move cooling medium past said heat exchange means so long as said sensing means senses that the vehicle remains parked.

2. The improvement set forth in claim 1 in which said fan means is powered by said engine through a clutch that is under the control of said fan control means such that said clutch remains engaged to couple said fan means in driven relation with said engine so long as said sensing means senses that the vehicle remains parked.

3. The improvement set forth in claim 2 in which said sensing means comprises two sensors, a first one of which senses that an accelerator that accelerates said engine from idle is in idle, and a second one of which senses that a parking brake of the vehicle that, when applied while the vehicle is parked, prevents wheels of the vehicle from rolling is in fact applied.

4. The improvement set forth in claim 2 in which said clutch comprises a solenoid that is selectively energized and de-energized to selectively couple said fan means in the non-driven and driven relation respectively with said engine, and said sensing means comprises switches that control the energization and de-energization of said solenoid.

5. The improvement set forth in claim 1 in which said fan means is powered by said engine through a clutch that is under the control of said fan control means, said clutch comprises a solenoid that is selectively energized and de-energized to selectively disconnect and connect said fan means from and to driven relation respectively with said engine, and said fan control means comprises means for causing said solenoid to remain energized and thereby cause said fan means to remain connected in driven relation with said engine so long as said sensing means senses that the vehicle remains parked.

6. In a vehicle that comprises:

A) a heat engine for powering the vehicle;

B) an accelerator that is operable from an idle position for accelerating said engine from idle;

C) an engine cooling system, including a radiator, through which engine coolant is circulated to cool said engine;

D) a passenger compartment;

E) an air conditioning (A/C) system, including a condenser, through which refrigerant is circulated to cool said passenger compartment;

F) fan means for moving air through said radiator and condenser to remove heat from both; and G) fan control means for controlling said fan means, including, 1) selection means for selecting and de-selecting said A/C system for operation;

2) first sensing means for sensing a condition of the engine coolant that calls for said fan means to move air through said radiator and condenser;

3) second sensing means for sensing a condition of the refrigerant that calls for said fan means to move air through said radiator and condenser; and 4) means for causing said fan means to move air through said radiator and condenser when said selection means is selecting said A/C system for operation and either said first sensing means senses said first condition or said second sensing means senses said second condition;

the improvement in said fan control means which comprises:

H) third sensing means for sensing that the vehicle is parked; and

I) means for causing said fan means to move air through said radiator and condenser upon concurrence of said selection means selecting said A/C system for operation and said third sensing means sensing that the vehicle is parked.

7. The improvement set forth in claim 6 in which said third sensing means comprises a sensor that senses that a parking brake of the vehicle that when applied while the vehicle is parked, prevents wheels of the vehicle from rolling, is in fact applied.

8. The improvement set forth in claim 7 in which said sensor comprises a switch that is open when said parking brake is not applied and that is closed when said parking brake is applied.

9. The improvement set forth in claim 6 and a fourth sensing means comprising a switch that is open when said accelerator is not in idle position and that is closed when said accelerator is in idle position, said means for causing said fan means to move air through said radiator and condenser requiring the further concurrence that said accelerator is in the idle position.

10. The improvement set forth in claim 6 in which said fan means is powered by said engine through a clutch that is under the control of said fan control means such that while said selection means is selecting said A/C system for operation, said clutch remains engaged to couple said fan means in driven relation with said engine so long as both said third sensing means senses that the vehicle is parked, and said fourth sensing means senses that said accelerator is in idle position.

11. The improvement set forth in claim 10 and a fourth sensing means comprising a switch that is open when said accelerator is not in idle position and that is closed when said accelerator is in idle position, said clutch comprising a solenoid that is selectively energized and de-energized to selectively couple said fan means in non-driven and driven relation respectively with said engine, and said third sensing means and said fourth sensing means comprise respective switches that control the energization and de-energization of said solenoid.

12. The improvement set forth in claim 10 in which said first sensing means comprises a pressure sensor for sensing refrigerant pressure and said second sensing means comprises a temperature sensor for sensing engine coolant temperature, and in which said means for causing said fan means to move air through said radiator and condenser upon concurrence of said selection means selecting said A/C system for operation and of said third sensing means sensing that the vehicle is parked, comprises a relay having a control coil connected in circuit with said third sensing means and a set of contacts that is under the control of said control coil and is connected in circuit with said engine coolant temperature sensor and said refrigerant pressure sensor.

13. A circuit for controlling engagement and disengagement of a fan clutch through which a fan for moving air both through a radiator for a heat engine that powers a vehicle and through an air conditioning (A/C) condenser of an A/C system for cooling a passenger compartment of such a vehicle is selectively connected to and disconnected from driven relation with such engine, said circuit comprising:

A) a solenoid that is selectively energized and de-energized to selectively engage and disengage said clutch;

B) first sensing means for sensing a condition of engine coolant circulated through such radiator that calls for said clutch to be engaged;

C) second sensing means for sensing a condition of refrigerant circulated through such condenser that calls for said clutch to be engaged;

D) third sensing means for sensing that a parking brake of such vehicle that, when applied while such vehicle is parked, prevents such vehicle from rolling, is in fact applied; and E) means operatively connecting each of said sensing means in circuit relation with said solenoid such that:
 1) said first sensing means is effective independently of said second, and third sensing means to cause said clutch to be engaged when sensing a condition of engine coolant that call for said clutch to be engaged;
 2) said second sensing means is effective dependently of said first and third sensing means to cause said clutch to be engaged when sensing a condition of refrigerant that calls for said clutch to be engaged; and
 3) said third sensing means is effective independently of said first and second sensing means to cause said clutch to be engaged when such A/C system is turned on and said third sensing means senses that such parking brake is applied.

14. A circuit as set forth in claim 13 in which said clutch is operatively related with said solenoid such that when said solenoid is energized, said clutch is disengaged, and when said solenoid is de-energized, said clutch is engaged.

15. A circuit as set forth in claim 14 in which said first sensing means comprises a first switch that is open when sensing a condition of engine coolant calling for said clutch to be engaged, said second sensing means comprises a second switch that is open when sensing a condition of refrigerant calling for said clutch to be engaged, and further comprising a fourth sensing means for sensing that an accelerator of such vehicle that is operable from an idle position for accelerating such engine from idle is in fact in idle position, said means operatively connecting said four sensing means in circuit relation with said solenoid comprises controlled switch means that is under the control of said third and fourth sensing means and that is open when such A/C system is turned on and said third and fourth sensing means concurrently respectively sense that such parking brake is applied and such accelerator is in idle position, and in which said first switch, said second switch and said controlled switch means are connected in a series circuit with said solenoid.

16. A circuit as set forth in claim 15 in which said controlled switch means comprises a relay having a set of normally closed contacts in said series circuit that is operated open when such A/C system is turned on and said third and fourth sensing means concurrently respectively sense that such parking brake is applied and such accelerator is in idle position.

17. A circuit as set forth in claim 16 in which said third sensing means comprises a third switch, said fourth sensing means comprises a fourth switch, and said third and fourth switches are connected in a further series circuit with a coil of said relay that controls said set of contacts of said relay.

18. A circuit as set forth in claim 17 in which a fifth manually-operated switch is disposed in series with said third and fourth switches for disabling said fan clutch control circuit while permitting operation of said A/C system.

* * * * *